United States Patent Office 2,977,154
Patented Mar. 28, 1961

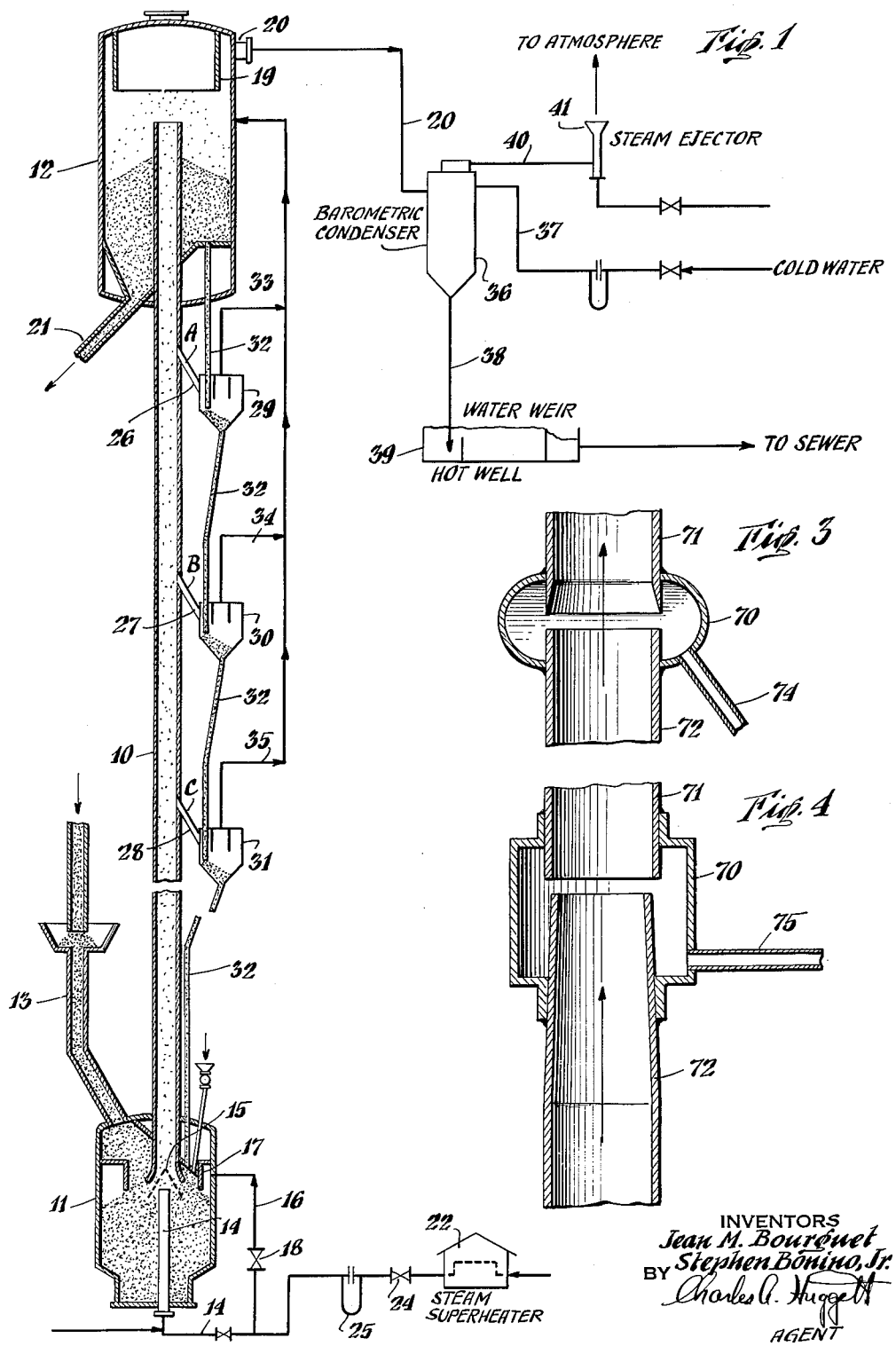

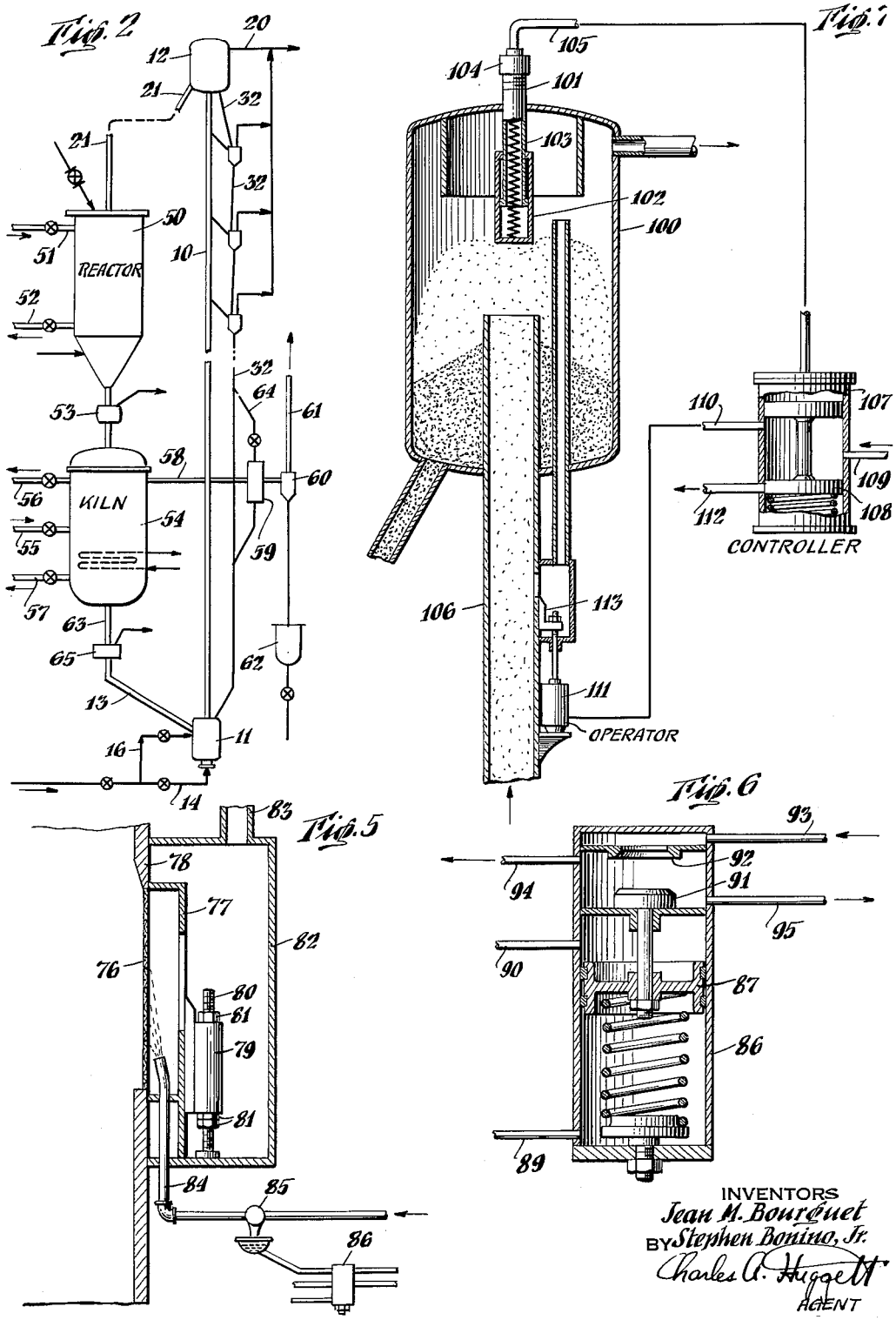

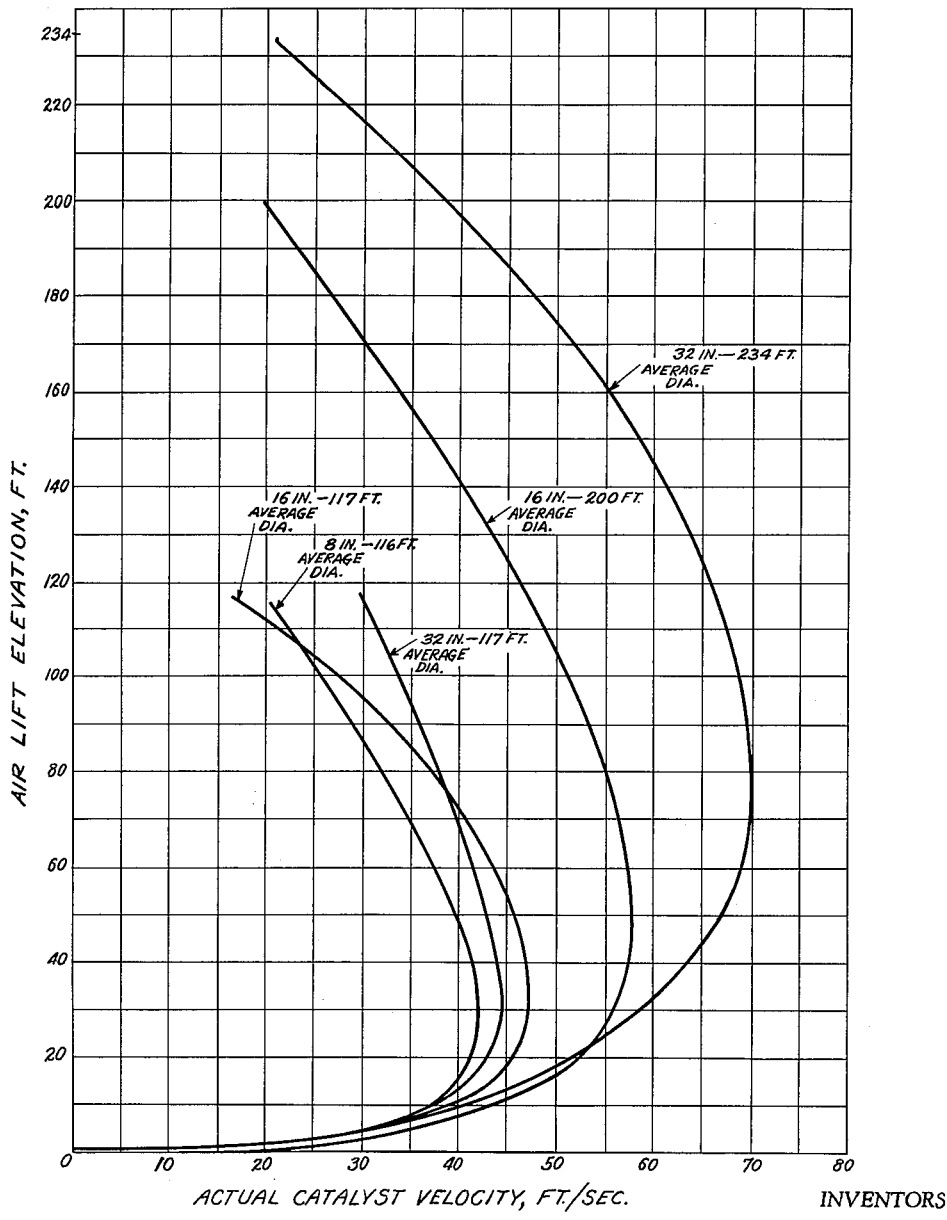

2,977,154

PNEUMATIC TRANSFER OF GRANULAR CONTACT MATERIAL

Jean M. Bourguet, Westville, and Stephen Bonino, Jr., Woodbury, N.J., assignors to Socony Mobil Oil Company, Inc., a corporation of New York Filed Apr. 8, 1955, Ser. No. 500,200

6 Claims. (Cl. 302—53)

This invention is concerned with the upward transfer of granular solids by the medium of a stream of lifting gas or vapor. It has particular application in the petroleum industry to those chemical conversion processes which utilize a continuously moving mass of refractory particles as a heat carrying or catalytic material. This application is a continuation-in-part of application Serial No. 211,344, filed February 16, 1951, and now abandoned.

In the petroleum industry many processes are known in which hydrocarbons, at temperature and pressure suitable for conversion, are contacted with a granular solid material in the form of a gravitating column to produce converted products. In these processes, it is necessary to continuously remove the contact material from the bottom of the column and lift it upwardly to a location above the column to complete, eventually, an enclosed cyclic path. It has been found expedient, in the prior art, to elevate the catalyst by means of bucket-type, continuous, mechanical elevators. For a variety of reasons, such as, for example, higher catalyst circulation rates, it is desirable to replace these elevators, to some extent, by gas lifts.

Examples of various processes in this industry which necessitate the use of granular catalysts are polymerization, dehydrogenation, cyclization, desulfurization, catalytic cracking and reforming. The invention is also applicable to processes wherein the contact material is inert and serves mainly as a heat carrying material, for example pyrolytic cracking or coking of hydrocarbon fractions. This invention will be illustrated in conjunction with a catalytic cracking process, being understood, however, to apply broadly to any process or operation in which it is desired to lift a solid material in particle form with minimum particle attrition and erosion of metal.

In the moving bed system of catalytic cracking, the particles in granular form are contacted with suitably prepared hydrocarbons while gravitating downwardly through a reaction zone in the form of a substantially compacted column. The feed stock, usually a gas oil boiling somewhat above the gasoline boiling range, cracks in the presence of the catalyst, forming substantial amounts of hydrocarbons which do boil in the gasoline boiling range. Incident to the cracking operation, a deposit of carbonaceous material or coke is laid down on the surface of the catalyst impairing its ability to function catalytically. The coked or spent catalyst is removed from the bottom of the reaction zone continuously and transferred to the top of a gravitating compact column of particles in a regeneration zone. The catalyst gravitating through the regeneration zone is contacted with a combustion supporting gas, such as air, to burn off the coke deposits from the surface of the catalyst. The coke-free or regenerated catalyst is withdrawn continuously from the bottom of the column in the regeneration zone and transferred to the top of the reaction zone, completing the continuous path. This process involves the use of high temperatures and may involve the use of high pressure. For example, the reaction zone may be maintained at about 800–1100° F., suitable cracking temperature, and the regeneration zone may be maintained at about 1000–1300° F., suitable regeneration temperature. The catalyst is lifted, therefore, at temperatures of approximately 800–1200° F., or thereabouts.

As the catalyst material gravitates through the zones, the gas or vapors contact the catalyst surface by passing through the interstices between the particles. It is desirable to maintain the flow of gas through the bed uniform for a variety of reasons. For example, channelling of the gas through the reactor may result in non-uniform coke deposition on the catalyst and non-uniform conversion of the hydrocarbon charge. The cracking efficiency is materially reduced from that which is obtained when the gas flows uniformly through the bed. Channelling in the regenerator causes the particles passing through the channel to overheat and thereby damage the catalystic activity of these particles. Those particles not receiving their share of combustion supporting gas are not sufficiently regenerated to regain their former cracking activity.

In order to provide uniform gas flow and prevent channelling, it is desirable to utilize catalyst particles of generally uniform size and shape, although some irregularity of size of particles is tolerable. For example, they may take the form of pellets, pills, uniform granules and spheres; spheres or beads being preferred. The particle size may range from about 3–100 mesh, Tyler Screen Analysis, and preferably 4–15 mesh Tyler. The catalytic material may be natural or treated clays such as bentonite, montmorillonite, or kaolin or may take the nature of certain synthetic associations of silica, alumina, silica and alumina, alumina-chromia, alumina-molybdenum oxide, etc., with or without the addition of various other metallic oxides. These materials are well known in the petroleum and related arts, being produced in the form of hard refractory particles having enormous adsorptive surface in relation to their size. For reactions in which the solid material acts mainly as a heat carrying medium, it may take the nature of fused alumina, Carborundum, quartz, metal balls or fragments, capsules, Corhart material, etc. The poured density of the contact material is between about 20–130 lb. per cu. ft., being the density of particles which are poured into a receptacle without packing or tamping. The hardness range of the particles is broadly 60–100 and preferably 80–100 hardness index. The hardness index is determined by the following procedure:

*Clay catalyst.*—Screen a sufficient quantity of catalyst which has been tempered at 1050° F. for 3 hours in substantially dry air atmosphere to obtain 80–100 cc. of particles which pass through a number 3 screen and remain on a number 5 screen. Transfer 80±2 cc. of the particles into an attrition can containing eight steel balls. Rotate the can with its axis in a horizontal position at 80±2 r.p.m. for one hour by means of the roller equipment specified below. Remove the sample from the can and screen over a number 6 screen, weighing the material retained on the screen to an accuracy of ±0.1 gram. The screenings are made by shaking for 10 minutes on a "Rotap" or "End-Shak" shaking machine using eight-inch test screens equipped with cover and pan.

Calculate the hardness index from the following formula:

$$\frac{\text{Weight on No. 6 screen} \times 100}{\text{Weight of No. 3 to No. 5 test sample}} = \text{Hardness index}$$

SPECIAL APPARATUS REQUIRED

"Ro-tap" or "End-Shak" screen shaker.

Eight inch nested standard testing screens, including cover and pan, which conform to A.S.T.M. Designation: E11–39.

Attrition can—3½ in. diameter by 3¾ in. long, friction fit lid (i.e., 1 lb. standard grease can).

Eight steel balls, smooth surface, 15/16 in. dia., 55±0.5 grams weight per ball.

Rotating machine adapted to rotate the can on its side at 80±2 r.p.m.

SYNTHETIC CATALYST MODIFICATION OF PROCEDURE

Tempering

For silica-alumina cracking catalyst, temper for 10 hrs. in substantially dry air atmosphere at 1400° F.

For chrome-silica-alumina cracking catalyst, temper for 3 hrs. in substantially dry air atmosphere at 1100° F.

Size of sample

Use 80±2 cc. of particles which pass through a number 3 screen and are retained on a number 8 screen.

Rolling

Same as for clay.

Rolled sample

Screen over a number 9 screen, weighing the material retained on the screen. The procedure followed is the same as for clay catalyst.

$$\text{Hardness index} = \frac{\text{Weight on No. 9 screen} \times 100}{\text{Weight of No. 3 to No. 5 test sample}}$$

Channelling occurs in these systems when catalyst attrition rates are high. Attrition involves the breaking or spalling of the catalyst particles when they impinge upon the metal walls of the inclosed system or against themselves, producing much smaller particles called fines. The fines tend to classify or gather together, especially when the catalyst is passed through sloping chutes. Attrition is also caused by the particles sliding against each other or against the metal walls. The fines must be minimized in the system by continual removal, necessitating the addition of new material to retain the catalyst inventory substantially constant.

This art has desired to use gas lifts to raise the contact material particles for a long time, but these efforts have been unsuccessful, largely because of the excessive attrition in the prior art pneumatic lift devices. The elevators used to lift the particles, while they are not bothered by serious attrition problems, have other undesirable limitations, such as maximum height and speed. In spite of the disadvantages of the elevators, gas lifts have never been used commercially, because no practical system had been discovered in which the catalyst attrition was not prohibitively high. One of the principal reasons for high attrition, it has been discovered, was the inability to properly control the gas velocity along the lift pipe. Prior art lifts characteristically involved substantial pressure drops between the ends of the lift. This resulted in gas expansion along the path of flow, and catalyst and lift gas shot out of the pipe at the upper end at high velocity, causing particles to hit metal surfaces at high velocity and also causing the particles to rise a substantial distance before starting a long fall onto the bed surface at the top of the pipe. The particles attained sufficient velocity during their long fall to cause excessive attrition when they collided with the substantially compact bed.

The object of this invention is to provide a method and apparatus in a continuous cyclic conversion system for pneumatically transferring granular solids which overcomes the difficulties and high attrition characteristics of the prior art.

It is a further object of this invention to lift granular solid material by means of a flowing gas with minimum attrition of the particles and erosion of the retaining material.

It is a further object of this invention to minimize attrition at the top of a gas lift through which is being raised by gas flow, refractory material in particle-size which is subject to fracture by shock blows.

It is a further object of this invention to minimize attrition and erosion at the top of a gas lift through which is being raised by gas flow cracking catalyst in the size range of about 3–100 mesh Tyler.

It is a further object of this invention to improve the lifting efficiency of a gas lift used to raise granular particles.

It is proposed according to the present invention to control the velocity of the contact material moving through the lift pipe by controlling the velocity of the lifting gas.

The invention will be disclosed in more detail in the following sketches, all highly diagrammatic in form, and the subsequent discussion of the apparatus and operation of the apparatus shown in the sketches.

Figure 1 shows an elevational view in section of a gas lift adapted to raise granular solids by gas flow;

Figure 2 shows a gas lift incorporated in a TCC system;

Figure 3 shows a means of withdrawing gas from a section of the lift pipe of a gas lift;

Figure 4 shows an alternate means of withdrawing gas from a section of the lift pipe of a gas lift;

Figure 5 shows a fragmentary section of a lift pipe with alternate means for removing gas from the lift pipe of the gas lift;

Figure 6 shows a sectional view of an automatic operator adapted for use in the gas removal system illustrated on Figure 5;

Figure 7 shows in vertical section the top portion of a gas lift and related apparatus adapted to automatically maintain the catalyst velocity at the top of the lift pipe constant; and Figure 8 is a graph plotting actual catalyst velocities in feet per second against the height of the lift, characteristic curves for lifts of several different heights and average diameters being illustrated.

Referring now to Figure 1, the lift pipe 10 may be a suitably elongated substantially vertical tube, preferably of circular cross-section, although other shapes may be utilized. The feed pot 11 is located at the bottom of the pipe and the separator 12 is located at the top of the pipe with the ends of the pipe projected into each vessel. Gravitating granular material is introduced into the top of the feed pot 11 through the conduit 13 in the form of a substantially compact column, forming a bed of the material about the lower end of the lift pipe. A primary lift gas is introduced through the conduit 14 to pass up the lift pipe without passing through any substantial thickness of the granular bed. A screen 15 prevents granular material from falling into the conduit 14 when the gas flow is stopped. A secondary lift gas is introduced into the bed through conduit 16 at a location a substantial distance away from the lower end of the lift pipe so as to pass through a substantial thickness of the bed. The secondary gas pushes the granular particles into the stream of primary gas where they are suspended and lifted up the pipe. The secondary gas may vary broadly between about 0–50 percent and preferably between about 5–15 percent of the total gas flow, depending upon the flow rate desired for the granular material. The valve 18 provides means for controlling the flow rate of the secondary gas stream, and hence, the flow rate of the granular material. The ring baffle 17 provides a suitable means of introducing the secondary gas into the bed at locations around the pipe. Suitable lift pots for feeding catalyst into the lift pipe are shown in copending cases Serial No. 75,642, filed February 10, 1949, now United States Patent No. 2,684,927 and Serial No. 76,017, filed February 12, 1949, now United States Patent No. 2,666,731. This case applies to any of the modifications described in the copending cases, as well as to lifts having other types of feed means.

The settling vessel 12 is substantially larger in cross-section than the lift pipe, causing the velocity of the lift gas to decrease after it leaves the lift pipe. The gas makes a reversal around the baffle 19 and is withdrawn through the conduit 20. The granules separate from the gas, falling onto the bed in the separator. The granular material is withdrawn from the separator through the conduit 21 as a compact column for use in any chemical or physical process, not shown, and the granules discharged from the process may be introduced into the conduit 13 to complete an enclosed cycle, if desired.

The lift gas may be any suitable gas, such as, for example, air, flue gas, nitrogen or superheated steam. In Figure 1, steam is used as the lift gas being formed in the furnace 22. The flow of steam through the line 23 may be controlled by the valve 24 to meet the requirements of primary and secondary lift gas. Detail 25 represents an expansion bend in the line 23 to prevent the development of excessive thermal stresses therein. The flow of primary steam is adjusted to provide stable, uniform lifting of the particles and the flow of secondary steam is controlled to regulate the amount or flow rate of solid particles lifted through the pipe. The lift pipe 10 has apertures in the wall at locations A, B and C. The lift gas is introduced into the bottom of the pipe at sufficient velocity to provide smooth feeding of the material into the bottom of the pipe. As the gas pressure drops along the pipe, the gas velocity increases. This causes the particle velocity to rise. By withdrawing gas at A, B and C the gas velocity in the pipe is brought under control and hence, the particle velocity is prevented from rising any substantial amount or is reduced to a controlled discharge velocity. The steam or lift gas is withdrawn through the conduits 26, 27 and 28 to separators 29, 30 and 31. The conduits are downwardly directed from the lift pipe at an angle between 0 and 90° with the horizontal, in order to prevent any substantial amount of the catalyst particles from being withdrawn with the gas. Most of the particles that do leave the pipe entrained in the gas are separated in the cyclone separators. An enclosed stream of catalyst is withdrawn from the lower section of the settling vessel and is directed through the three cyclone separators to pick up the separated particles and return them downwardly to the lift pot 11. The stream flow is more than sufficient to provide a compacted column in the conduit 32 high enough above the lift pot 11 to effect smooth feeding of the catalyst into the pot. The gas or stream withdrawn from the cyclones through the conduits 33, 34 and 35 is led either to the settling vessel 12, the discharge conduit 20 from the vessel or some other vessel maintained at the pressure required to provide the pressure drop necessary to obtain the withdrawal from the pipe of the required quantity of gas.

The steam withdrawn from the settling vessel 12 through the conduit 20 is introduced into the barometric condenser 36. Cold water is introduced into the barometric condenser 36 through the line 37 to condense the steam and maintain desired vacuum. By this procedure, the desired pressure drop across the lift pipe may be maintained without requiring pressure much above atmospheric in the lift pot 11. The condensed water is drawn off through the conduit 38 to a hot well 39, and subsequently taken to the drain. A small amount of catalyst fines are occluded by or suspended in the water and are discharged with the water to the sewer. Non-condensible and non-condensed gases are withdrawn from the top of the condenser through the line 40 by the steam ejector 41.

Referring now to Figure 2, the gas lift is shown incorporated in a TCC system, similar numbers being used to indicate parts similar to those shown in Figure 1. The settling vessel 12 is made large enough to serve in a dual capacity, both as a separating means and a surge hopper to allow for irregularities in catalyst flow through the TCC system. The conduit 21 serves as an elongated feed leg to transfer the catalyst from the hopper 12 into the reaction vessel 50. The reaction vessel may be operated at a pressure which is higher than that of the separator, i.e., 5-30 p.s.i. (gauge), and the catalyst will feed into the vessel through the conduit 21 without valves or restrictions, provided the leg is suitably shaped and sufficiently long. The feed leg must be substantially vertical, thereby requiring a taller gas lift when the pressure differential is increased.

The catalyst is gravitated through the reactor 50 as a compacted column and contacted therein with hydrocarbons, suitably prepared for reaction, introduced through the conduit 51. The reactants may be in liquid, vapor or mixed liquid and vapor form, preheated, generally, to about 700-800° F., although higher or lower temperature may, in certain instances, be used, depending, to some extent, upon the type of charging stock. The hydrocarbons are converted in the vessel upon contacting the catalyst to more desirable materials and the products are removed from the vessel through the conduit 52 to fractionation and processing apparatus, not shown. The spent catalyst is withdrawn continuously from the bottom of the vessel and introduced into a depressurizer 53, usually, where the pressure is reduced practically to atmospheric. This is done, primarily, because it is simpler and more economical to regenerate or restore the material at substantially atmospheric pressure.

The depressurized catalyst is gravitated downwardly as a compact column through the regenerator or kiln 54 wherein it is contacted with combustion supporting gas and the coke deposits are burned. The catalyst may enter the vessel at a temperature in the neighborhood of 800-1000° F. and be removed therefrom at a temperature in the neighborhood of about 1100-1300° F. Temperatures higher than the above heat damage the catalyst impairing its catalytic activity. Where only a heat carrying medium is required, however, inert refractory particles, such as Corhart or mullite, may be used and restored at temperatures well in excess of the above without damage. In order to control the temperature in the kiln, cooling coils may be utilized. Air is introduced into the kiln 54 through the conduit 55 and travels both upwardly and downwardly through the bed, being withdrawn through the conduit 56, 57. A stream of flue gas is taken from the kiln through the conduit 58 to the elutriator 59 located in the catalyst line 64. Fines are removed with the flue gas to the cyclone separator 60. The flue gas is discharged upwardly through the stack 61 and the fines are dropped into the storage hopper 62.

The catalyst is withdrawn from the bottom of the kiln through the conduit 63. The catalyst is depressurized, if necessary, in the vessel 65, which also provides an outlet for any lift gas which passes upwardly through the catalyst column in the conduit 13.

In general, the catalyst velocity and gas velocity in the lower and intermediate section of the lift for smooth operation will depend, to some extent, upon the physical dimensions of the lift. Broadly the wide range of the catalyst equilibrium velocity is about 5-300 ft. per sec., whereas a practical range for commercial use is about 5-75 ft. per sec. The catalyst equilibrium velocity is the difference between the gas actual linear velocity, at any given location in the lift pipe, and the catalyst terminal velocity. The catalyst terminal velocity depends on the catalyst density, form and shape, and upon the particular lift gas or gases and also the temperature and pressure conditions involved. Terminal velocity as used herein refers to the theoretical maximum velocity that can be reached by a partical of given size, shape and weight gas propelled in a lift of infinite height. It is to be appreciated that equilibrium velocity as used herein is not the actual velocity of either the gas or the contact material. It is, on the other hand, an easily calculated theoretical velocity which is functionally related to actual velocity. In general, the equilibrium velocity is higher than the actual catalyst velocity in the lower one-third of a lift and lower in the upper two-thirds. The average equilibrium velocity and the average actual velocity are usually substantially the same. The catalyst terminal velocity for any given condition can be calculated from equational relationships or estimated from data which are available in the public literature. It may be determined by routine experimental methods, well known in the art. The values of catalyst equilibrium velocities referred to herein are those in the lower end of and in the inside region of the lift pipe. For a small lift about 40 ft. tall and 3 inches inside diameter, the catalyst equilibrium velocity may range from about 5–50 ft./sec., whereas for a large lift about 200 ft. tall and 17 inches inside diameter, the catalyst equilibrium velocity may range from about 35–75 ft./sec. In general, the gas velocity will range from about 30–150 ft./sec., being about 30–120 ft./sec. for the small or short lift and 70–150 ft./sec. for the large or long lift, previously described. The solids concentration may vary over a wide range, depending upon the physical dimensions of the pipe and being adjusted by the control of relative rates of flow of primary and secondary lift gas. In general, the concentration is controlled in lifts having other feeding arrangements by control of the relative amounts of gas and catalyst entering the lower end of the lift pipe by one means or another. In general, for a long-lift pipe, concentrations up to at least 3 pounds per cubic foot are found satisfactory whereas for a short lift pipe higher catalyst concentrations, up to about 15 pounds per cubic foot are found satisfactory.

The gas withdrawal ports in the lift pipe can be of any shape, but the preferred shape is in the form of a narrow slot horizontally about the pipe. The ports may be, however, in the form of a circular hole, a triangular hole, or even a long narrow spiral slot extending along a substantial length of the pipe. The ports must be located where the pressure differential across the port is high enough to push the desired quantity of gas out the aperture, and they must be far enough below the upper end of the lift pipe to effect the desired control of the particle velocity. It may be desirable to prevent the particle velocity from rising in the top portion of the lift pipe, or from rising any substantial amount. Or, depending upon the velocity requirements at the bottom of the pipe and the characteristics of the particle-form material, it may be desired to effect a reduction of the velocity of the contact material in the upper portion of the lift pipe. For the contact materials normally used in these processes, it is found necessary to maintain the particle discharge velocity at the top of the pipe broadly within the range of 5–35 ft./sec. and preferably within the range of 10 to 25 ft./sec. Although all the gas may be withdrawn through one port at one level, where this would result in a large port with consequent large entrainment of catalyst in the gas, it may be more desirable to use several ports of smaller area, each withdrawing a portion of the total gas. These ports are preferably spaced along the pipe to provide a gradual and uniform particle velocity change. Some of the suitable port locations and arrangements are summarized as follows:

(1) A continuous spiral around the upper portion of the lift pipe sized to give either a constant particle velocity or a constant rate of change of particle velocity.

(2) A plurality of orifices at equal vertical intervals either of equal area or adjusted to give the same rate of particle velocity reduction at each port.

(3) A plurality of ports spaced at such intervals and having such area that the particle deceleration rate is the same at each port and equal amounts of gas are withdrawn at each level.

(4) A plurality of ports of equal area arranged at such intervals that the rate of particle deceleration is substantially constant.

In all cases it is preferred to withdraw gas with a minimum of catalyst entrainment, and the number, shape and spacing of the ports should be arranged to effect this end. Preferably but not necesasrily, the arrangement should be selected to provide a gradual and uniform rate of velocity change, without causing excessive jerks or fluctuations in flow. Sufficient space should be allowed between ports, particularly between the uppermost port and the top of the lift pipe, to permit the catalyst to reach the desired velocity. This distance between ports and between the first port and the top of the pipe should be broadly no less than about 5 percent of the lift pipe height and preferably no less than about 10–20 percent of the lift pipe height.

The velocity of the catalyst issuing from the top of the pipe should be set within the limits above-specified. Once having set this velocity, the selection of the proper number of ports and the area thereof can be calculated, using the above-indicated principles and knowing the particular rate of gas and catalyst entry into the lift, the temperature, pressure and pressure drop, and catalyst and gas physical characteristics.

Typical examples are:

EXAMPLE 1

When using a 200 foot lift having an inside diameter of 15 inches, gas can be withdrawn at a single port 60 feet below the top of the lift pipe satisfactorily at a catalyst transfer rate of 200 tons per hour. The catalyst comprises synthetic gel spherical beads having a diameter of 0.1–0.2 inch and an apparent or poured density of 42 pounds per cu. ft. Using steam as the lift gas at a temperature of about 800° F., the pressure drop across the pipe is 7 pounds per sq. in. The pressure at the top of the pipe is 7.7 pounds per sq. in. absolute, effected by condensation of the steam as previously described. The pressure at the gas withdrawal port is 9.4 pounds per sq. in. absolute. The steam velocity in the lower section of the pipe is 103 ft. per sec. and the catalyst equilibrium velocity at that location is 39 ft. per second. The gas withdrawn through the port is 47.5 percent of the gas in the pipe resulting in a catalyst velocity of 15 ft. per sec. at the top of the pipe. The area of the port is 82 sq. in.

The area of the port in the above example is too large for normal operation without a screen to prevent the particles from escaping through the port with the gas withdrawn. Referring to Figure 5, an example is shown wherein a mesh screen is used over to the port area to prevent catalyst withdrawal through the port.

EXAMPLE 2

When using a 200 foot lift having an inside diameter of 15 inches, gas can conveniently be withdrawn at three locations 20, 40 and 60 feet below the top of the pipe. Lifting 200 tons synthetic gel catalyst beads per hour which have a diameter of 0.1–0.2 inch and an apparent or poured density of 42 pounds per cu. ft., the gas velocity below the lowest port is 103 ft. per sec. and the catalyst velocity at that point is 39 ft. per sec. The lift gas is superheated steam at about 1000° F. with the pressure drop across the pipe being 7 pounds per sq. in. The lowest port has a cross-section of 26.6 sq. in. and 16 percent of the total gas flow through the pipe is withdrawn at that point. This withdrawal was selected to give a deceleration force of about ⅓ gravity at the location just above the outlet port. Just below the second port, 40 feet below the top of the pipe, the gas velocity is 87 ft. per sec. and the catalyst velocity is 33 ft. per sec., substantially equilibrium velocity for the catalyst at that gas velocity. The area of the second port is 13.2 sq. in. and 11 percent of the total gas flow is withdrawn at that point, resulting again in a deceleration force of about ⅓ gravity just above the port. The gas velocity just below the top port is 82 ft. per sec. and the catalyst velocity is 20.5 ft. per second. The area of the port is 20 sq. in. and the gas withdrawal at that location is 25 percent of the total gas flow. The gas discharges from the top of the pipe at a velocity of 72.5 ft. per sec. and the catalyst at 15 ft. per sec. The gas pressure at the bottom of the lift pipe is 14.7 p.s.i.a., at the top of the pipe 7.7 p.s.i.a., and at the three ports 7.9 to 8.2, 8.0 to 8.5, and 8.4 to 8.8.

The above example provides equal deceleration of ⅓ gravity at each withdrawal point. If desired, however, the gas could be withdrawn in equal amounts at each port. The steam consumption is about 7000 pounds per hour.

No screen is required in the second example, and the ports may have the appearance of those shown in Figures 3 and 4. The manifold 70 surrounds the ends of the pipes 71, 72. In Figure 3 the withdrawal conduit 74 is directed downwardly at an angle of about 50–60 degrees, which is preferred. Although the pipes 71, 72 have the same inside diameter, the top pipe is beveled at the juncture to deter catalyst from following the gas out the port. In Figure 4 the upper end of the lower pipe 72 is tapered slightly, so that the inside diameter of the lower pipe is slightly smaller than the inside diameter of the upper pipe, similarly deterring the escape of catalyst from the lift pipe with the withdrawn gas. The conduit 75 is located at an angle of about 90 degrees with reference to the lift pipe but at a location somewhat below the level of the outlet port. Both schemes in effect cause a downward reversal of the gas withdrawn from the pipe which acts to minimize the amount of particle-form material withdrawn from the lift pipe with the gas. Both withdrawal schemes indicated are satisfactory in the second example.

Referring to Figure 5 again, a withdrawal port having an adjustable area is shown. The screen 76 prevents catalyst from escaping with the gas. The baffle 77 is attached to the wall of the lift pipe 78 over the outlet port and defines the maximum size of the port. The adjustable valve 79 is adapted to cover a portion of the port, adjustment being obtained by the lead screw 80 and nuts 81. The designation 82 represents a chamber into which the gas is withdrawn. The gas is then discharged through the conduit 83 to a region of lower pressure, adapted to provide the appropriate gas withdrawal. The screen may become plugged with the smaller catalyst particles, at which time steam or other gas may be injected behind the baffle 77 through the conduit 84 to clear the screen. The operation of the steam jet may be made automatic by using the control valve 85 in the line 84, operated by controller 86. An enlarged view of the controller 86 is shown in section in Figure 6. The double-action piston 87 has seal rings located on its periphery to prevent control fluid from passing. The position of the piston is adjusted by the spring and tensioning nut. The tubes 89, 90 connect through the wall of the lift pipe at the top and bottom therefore to place across the piston 87 the same pressure differential as occurs across the lift pipe. The controller 87 is adjusted to place the valve 91 in the closed position on its seat 92 when the screen in the lift pipe is clear. When the port clogs, the pressure drop across the lift pipe rises and hence, the valve 91 is opened, allowing fluid under pressure to enter through the conduit 93 and out through the conduit 94 to operate the valve 85. The excess fluid drains through the conduit 95 to a reservoir and pump, not shown. Thus, when necessary, steam is injected to automatically clean the screen 76.

The catalyst velocity and gas velocity through the lift pipe may fluctuate from time to time, requiring adjustment of the area of the withdrawal aperture or apertures for peak performance. This can be done automatically by the procedure shown in Figure 7. Projected downwardly through the top of the separator 100 is the stationary member 101 having a circular cross-section. The mating cylindrical member 102 is adapted to slide along the lower end of the member 101. Within the mating members is a spring 103 adapted to place a downward force on the moving member. The tension of this spring can be adjusted by the nut 104. A conduit 105 is connected with the fixed member 101 adapted to carry a pressure indicating fluid. The moving member 102 floats on the fountain of catalyst or particles issuing from the upper end of the lift pipe 106. When the particle velocity increases, for any reason, the member 102 rises, increasing the pressure in the conduit 105. This is connected to a controller 107, applying a displacement force on one side of a double-piston controller valve 108. Control fluid from a pump not shown is introduced into the controller 107 between the pistons from the conduit 109, and as indicated, passes through the conduits 110 to the valve actuator 111. The valve actuator is spring biased to the open position, the fluid pressure tending to close the port outlet. With increase of pressure on the spring biased piston in the controller 107, the drain conduit 112 is opened allowing the pressure between the pistons and also in the actuator 111 to drop, thereby permitting the spring in the actuator to open the valve 113. The catalyst velocity is, thereby, reduced, as previously described.

When gas is withdrawn through ports in a lift pipe of a gas lift, the pressure differential across the lift pipe is reduced per unit of air supplied at bottom and the catalyst flow is increased, indicating recovery of the kinetic energy of the catalyst, and increased horsepower efficiency of the lift. This is illustrated in the following example:

EXAMPLE 3

Using a lift pipe 42.7 feet high with an internal diameter of 3 inches, the ports were located as follows:

| Port | Distance Below Top of Pipe, ft. | Cross-Sectional Area, sq. in. |
|---|---|---|
| 1 | 13.35 | 1 |
| 2 | 10.85 | 1 |
| 3 | 8.75 | 0.5 |
| 4 | 5.85 | 0.5 |

The rise of catalyst was maintained at 3 feet with the ports open as follows:

| Run No. | Port Condition | Differential Pressure, in. of Hg | Catalyst Flow, tons/hour | Catalyst Rise, ft. |
|---|---|---|---|---|
| 1 | Closed | 10 | 14.6 | >3 |
|   | Open | 9 | 16.6 | 3 |
| 2 | Closed | 7.4 | 12.6 | >3 |
|   | Open | 7 | 13.2 | 3 |

In summary, withdrawing gas at one or more locations along the lift pipe of a gas lift, in a manner disclosed by this invention, provides several distinct advantages, particularly when lifting granular catalyst of about 4–15 mesh Tyler. (a) It permits a reduction in the height of the top disengaging vessel. (b) It provides a reduction of the average velocity of the catalyst in the lift pipe and thereby reduces the attrition of the catalyst in the lift pipe. (c) It permits adjustment for a minimum rise of catalyst above the end of the pipe, thereby reducing catalyst attrition due to free fall. (d) It avoids contacting the top of the disengaging vessel or other metallic parts with raining catalyst, reducing both catalyst attrition and metal erosion. (e) It permits a reduction of the differential pressure between the top and bottom of the lift, recovering the kinetic energy of the catalyst and increasing the horsepower efficiency of the lift.

From a study of the foregoing examples it is apparent that there has been developed as a part of this invention a gas lift designed and operated so that the contact material is rapidly accelerated to prevent attrition due to local recycling in the low portions of the lift pipe and gradually decelerated so that the contact material issues from the top of the lift pipe at a velocity low enough to prevent attrition damage incident to its change in direction as it is separated from the propelling gas. In Figure 8, five curves are shown representing actual catalyst velocity in lifts of different sizes and heights. From the legends applied to the curves on the graph, it will be seen that curves are plotted for one 8 in. average diameter—116 ft. high lift, one 16 in. average diameter—117 ft. high lift, one 32 in. average diameter—117 ft. high lift, one 16 in. average diameter—200 ft. high lift, and one 32 in. average diameter—234 ft. high lift. From a study of these curves it will be observed that the catalyst is rapidly accelerated to maximum velocity which it achieves at about ⅓ the height of the column or, in any event, at less than ½ the height of the column. It is further to be observed that the deceleration in the upper ⅔ of the column is more gradual than the acceleration in the lower ⅓ of the column. It has been found as a part of this invention that rapid acceleration of the contact material in the lower region of the lift prevents surging, whipping and recycling with resulting large improvement in attrition. On the other hand, this advantage would be lost were the material to be separated from the propelling gas at the maximum velocity achieved in the lift. It is, therefore, highly important that the material be decelerated before separation and, in this specification, there are set forth several ways in which this desirable deceleration can be brought about.

It will be appreciated that since the velocity of the contact material is equal to the velocity of the gas less the instantaneous resistance to lift of the particles, actual catalyst velocity is a function of gas velocity. This invention, therefore, teaches the acceleration of the gas in the lower portion of the lift to such a value as to bring about rapid acceleration of the contact material particles and then a gradual deceleration of the gas sufficient to bring about a gradual deceleration of the particles.

It has been found satisfactory to achieve maximum catalyst velocity in the lower half of the lift, for example, at about ⅓ of the total height as will be borne out by the graphs of Figure 8.

It is seen, therefore, that by permitting reduction of gas velocity to specified ranges a critical reduction of attrition is effected without reduction in catalyst handling capacity of the lift and with an increase in its overall horsepower efficiency. It is intended that the scope of this invention be considered broadly to cover all changes and modification of the examples of the invention herein chosen for purposes of the disclosure, which do not constitute departures from the spirit of the invention.

What is claimed is:

1. An improved method of lifting granular solid material through an upwardly extending laterally-confined lift passage which comprises contacting granular material with a lift gas, so as to effect suspension and transfer of the particles into the passage, withdrawing gas from the passage in a lateral and downward direction intermediate the ends of the passage, so as to control the upward velocity of the particles without withdrawing from the passage any substantial amount of the granular material, and discharging the remaining gas and granular material from the top of the passage into a receiving zone, at a level located above the level at which gas is withdrawn from the passage.

2. An improved method of lifting granular solid material through an upwardly extending laterally-confined lift passage which comprises contacting granular material with a lift gas, so as to effect suspension and transfer of the particles into the passage, withdrawing gas from the passage in a lateral and downward direction intermediate the ends of the passage through ports larger than the granules of said material, so as to control the upward velocity of the particles without withdrawing from the passage any substantial amount of the granular material, and discharging the remaining gas and granular material from the top of the passage into a receiving zone, located at a level above the uppermost gas withdrawal port in said passage.

3. A means for controlling the upward velocity of a particle-form contact material in a lift pipe, as described, comprising separated sections of the lift pipe, the ends located one just above the other, so as to leave a continuous slot in the wall of the pipe, a housing attached to the ends of the pipe, so as to form a gas receiving chamber, the internal cross-section of the lower section of pipe being slightly smaller than the cross-section of the upper section at their adjacent ends, and means for withdrawing gas continuously from the housing.

4. The method of controlling the upward velocity of a granular solid material through a vertical lift pipe which comprises contacting said granular material with a lift gas at the lower end of said lift pipe to effect a rapid acceleration of said material in the lower portion of said lift pipe, withdrawing a gaseous stream at least substantially free of solid material from said lift pipe at a location between the ends of said pipe but substantially below the upper end of said pipe to effect a gradual deceleration of said materials in said upper portion of said pipe and discharging the solid material from the upper end of said pipe into a separating zone located about the upper end of the pipe and above the level at which gas free of solid material is removed from the pipe, whereby attrition is minimized.

5. Claim 4 further characterized in that gas free of solid material is removed from the lift pipe at several spaced levels below the separation zone in controlled amounts to effect a gradual deceleration of the solid material before said solid material is discharged from the upper end of the lift pipe, whereby attrition of the solid material is minimized.

6. Apparatus for transferring granular contact material upwardly with minimum attrition comprising a vertical lift pipe open at both ends, a lift pot located about the lower end of said lift pipe, adapted to maintain a pot of granular contact material about the lower end of the lift pipe, means for supplying contact material to the lift pot, means for supplying lift gas to the lift pot, to suspend and transfer the contact material upwardly through the lift pipe, a separator located about the upper end of the lift pipe, of substantially greater cross-section than the lift pipe, means for withdrawing lift gas from said separator substantially free of contact material, means for withdrawing contact material from said separator, outlet means located in the wall of said lift pipe at a level below the separator adapted for removal of a portion of the lift gas substantially free of contact material, said outlet means comprising a series of outlets located at staged levels along the lift pipe below the separator whereby separate streams of gas are withdrawn to effect gradual deceleration of the contact material before the contact material is discharged from the upper end of the lift pipe into the separator with minimum attrition.

References Cited in the file of this patent

UNITED STATES PATENTS

| | | |
|---|---|---|
| 1,597,438 | Ennis | Aug. 24, 1926 |
| 2,684,870 | Berg | July 27, 1954 |
| 2,684,872 | Berg | July 27, 1954 |
| 2,684,873 | Berg | July 27, 1954 |
| 2,693,395 | Berg | Nov. 2, 1954 |
| 2,694,605 | Berg | Nov. 16, 1954 |
| 2,699,970 | Closs | Jan. 18, 1955 |